(12) United States Patent
Dietrich, Sr.

(10) Patent No.: US 6,178,900 B1
(45) Date of Patent: Jan. 30, 2001

(54) COMBINATION CHISEL PLOW AND FERTILIZER PLACEMENT APPARATUS

(75) Inventor: William J. Dietrich, Sr., Congerville, IL (US)

(73) Assignee: Case Corporation, Racine, WI (US)

( * ) Notice: Under 35 U.S.C. 154(b), the term of this patent shall be extended for 0 days.

(21) Appl. No.: 09/211,397

(22) Filed: Dec. 14, 1998

Related U.S. Application Data (60) Provisional application No. 60/069,602, filed on Dec. 15, 1997.

(51) Int. Cl.[7] ............................. A01C 5/08; A01C 23/02
(52) U.S. Cl. ....................... 111/119; 111/124; 111/152; 111/187; 111/188
(58) Field of Search .................................. 111/188, 187, 111/186, 124, 152, 119

(56) References Cited

U.S. PATENT DOCUMENTS

| | | | |
|---|---|---|---|
| 3,854,429 | * 12/1974 | Blair | 111/188 |
| 4,592,294 | * 6/1986 | Dietrich, Sr. et al. | 111/187 X |
| 4,638,748 | * 1/1987 | Kopecky | 111/187 X |
| 4,760,806 | 8/1988 | Bigbee et al. | 111/87 |
| 4,770,112 | 9/1988 | Neumeyer | 111/73 |

\* cited by examiner

*Primary Examiner*—Christopher J. Novosad
(74) *Attorney, Agent, or Firm*—Emrich & Dithmar

(57) ABSTRACT

A fertilizer applicator assembly for use with a chisel plow includes a diverter shoe located in the root zone of the crop, above the tillage point of the plow. The diverter shoe closes the furrow formed by the plow shank and forms a lateral pocket in the soil for distributing a band of particulate fertilizer behind and to the side of the shank.

17 Claims, 7 Drawing Sheets

COMBINATION CHISEL PLOW AND FERTILIZER PLACEMENT APPARATUS

RELATED APPLICATION

This application claims the benefit of the filing date of copending U.S. Provisional Application Ser. No. 60/069,602, filed Dec. 15, 1997.

FIELD OF THE INVENTION

The present invention relates to agricultural apparatus for combining primary soil tillage and select fertilizer placement in a single working device so that both functions can be accomplished in a single pass.

BACKGROUND OF THE INVENTION

No-till farming which contemplates little or no soil tillage between harvesting and planting, has been practiced for many years to reduce soil erosion. Farmers have learned, however, that at least some tillage is desirable to promote water absorption and retention by the soil and to facilitate crop root development.

In an effort to reduce erosion while allowing some tillage, it has become desirable to leave as much crop residue as possible on the surface consistent with the farmer's desire to perform some tillage to increase moisture absorption and retention. The tradeoffs made between, on the one hand, the desire not to disturb surface crop residue, and, on the other hand, the desire to provide some primary tillage, even if in selected paths, have become of increasing significance in the design of tillage tools because the two objectives militate against each other. Thus, chisel plows have been re-designed to fracture soil in narrow, spaced bands at a primary tillage level while attempting to reduce or eliminate disturbance of surface residue. Residue on the surface not only retains the soil and reduces the effects of water run-off, but it also enhances moisture retention and reduces evaporation, and this, in turn, promotes crop emergence. These practices of no-till or minimum residue disturbance are particularly important in those fields which carry H.E.L. (i.e., highly erodible land) designation of the U.S. Department of Agriculture.

When the only tillage performed leaves the crop residue on the surface substantially undisturbed, mixing of the surface soil with deeper soil is very much reduced. In the past when primary tillage was accomplished with moldboard plows or parabolic shank chisel plows, fertilizer was spread on the surface of the soil, and the soil was then tilled with disc gangs, field cultivators, moldboard plows or chisel plows with parabolic shanks. Not only the surface soil, but deeper soil as well, were mixed together and the fertilizer was distributed throughout, both laterally and at various depths. As a result there was a better distribution of surface soil, fertilizer and residue; and nutrients were available to the crop at the root level. In addition, with these practices, some deeper soil, where compaction is greater, is rotated to the surface.

Crop residue also contains significant amounts of nutrients, and mulch. When the crop residue is incorporated in the soil, those benefits also are returned to the soil. Even when the residue is left on the surface, eventually, with tillage planting and cultivation, those nutrients are returned to the soil and surface mulch is provided.

Chisel plows that are characterized as "no-till", such as shown in the U.S. Pat. No. 5,540,288, accomplish the purpose of leaving the surface residue intact while relieving deep compaction caused by planting and harvesting equipment and also heavy rainfall which causes hydraulic compaction. Another tillage point, which is more aggressive in tilling the soil is disclosed in my U.S. Pat. No. 5,437,337.

It has also become desirable to reduce the number of "passes" made on the soil with different farming functions. For example, fertilizer and/or chemicals may be applied during planting. Fertilizer knives have been used to apply both dry and liquid fertilizer below the soil surface. These knives are generally operated at the depth at which it is desired to place the fertilizer for availability to mature crops, which is in the range of approximately 4–8 in., sometimes referred to as the "root zone". This practice satisfies the need to place fertilizer at the desired depth, but it falls short of performing primary tillage at the desired depth range, which is approximately 10–12 in. A chisel plow as disclosed in the above '288 patent is often run at 10 or 12 inches deep, but the placement of fertilizer should not be deeper than 4–8 inches for most applications. It is a prevailing belief that if fertilizer is placed at a depth below 8 in., it is not available to the crop (primarily corn and soybeans). It is also prevailing belief, in connection with row crops, that fertilizer is placed more cost effectively and more efficiently if it is "banded" in the "root zone" of the crop—that is, distributed at the proper depth and in a band of fairly well defined width so that it is available to the crop as the roots develop during growth.

With present commercial systems designed for modern agricultural practices, there is no present device which will accomplish, in a single pass, those results which are believed to be the most desirable. These results include:

(i) Providing some deep tillage in the range of approximately 10–12 in., thus fracturing, raising and mixing of some of the deeper, more compacted soil;

(ii) Leaving surface residue and soil substantially undisturbed; and (iii) Depositing fertilizer in the desired depth range of approximately 4–8 in. below the surface and in a defined band to enhance availability for developing roots. The present invention is designed to achieve these results in a single pass.

SUMMARY OF THE INVENTION

The present invention includes a chisel plow with a rigid shank which has a tillage work unit mounted at the bottom of the shank for operating in the depth range for primary tillage. A delivery (or "drop") tube is mounted behind the shank for depositing particulate fertilizer, normally with air assist. A discharge orifice of the delivery tube is located at the desired depth for the particular application, usually in the range of approximately 4–8 in.

A combination diverting plate and wing, called a "shoe", is mounted to the shank at the level of the desired fertilizer placement for forming a soil pocket or shelf to one side of the shank as the shank passes. The shoe intercepts at least part of the fertilizer stream flowing from a discharge opening in the fertilizer delivery tube, and diverts it into the formed pocket in the form of a band defined by the shoe. This places the fertilizer at the desired depth, and the formed pocket traps the fertilizer at the desired depth and prevents it from falling further to the tillage depth because the shoe is shaped and located to close the furrow formed by the chisel plow shank before the fertilizer is placed into the pocket formed by the shoe.

The shoe and drop tube and, if desired, an anhydrous ammonia delivery tube are formed into a weldment which is adjustably mounted to the shank of the chisel plow by any suitable structure permitting height adjustment. Thus, the operator may adjust the depth of fertilizer placement relative to the tillage depth. Preferably, there is a difference in the range of approximately three to nine inches between the bottom of the tillage furrow and the level of fertilizer placement. More than one shoe may be installed on each shank so that some of the fertilizer will be placed by the upper shoe, and the remainder by a lower shoe. In this case, the upper shoe may be located at a depth of 2 or 3 inches below the surface to place a small amount of fertilizer for crop emergence and initial growth; and the balance of the fertilizer is placed at a depth of 6 to 8 inches in more moist soil where it is available during a dry spell when the crop is mature.

Moreover, with the system of the present invention, conventional row markers can be mounted on the implement frame, and the shanks can be located the same distance apart and in the same number as the planter row units which will be planting the succeeding crop. For example, 8 combination tillage/fertilizer shanks can be set 30 inches apart to match an 8 row, 30-inch planter spacing, intended to be used in the following planting season by the farmer. By using a planter with the same number of row units and the same row spacing planter, row indexing occurs, and the next year's crop is planted on top of the soil tilled by the chisel shank. The crop is also planted above and slightly to the side of the fertilizer band or bands that have been placed.

Other features and advantages of the present invention will be apparent to persons skilled in the art from the following detailed description of a preferred embodiment accompanied by the accompanying drawing where identical reference numerals will refer to like parts in the various views.

DETAILED DESCRIPTION OF A PREFERRED EMBODIMENT

Figure 1:
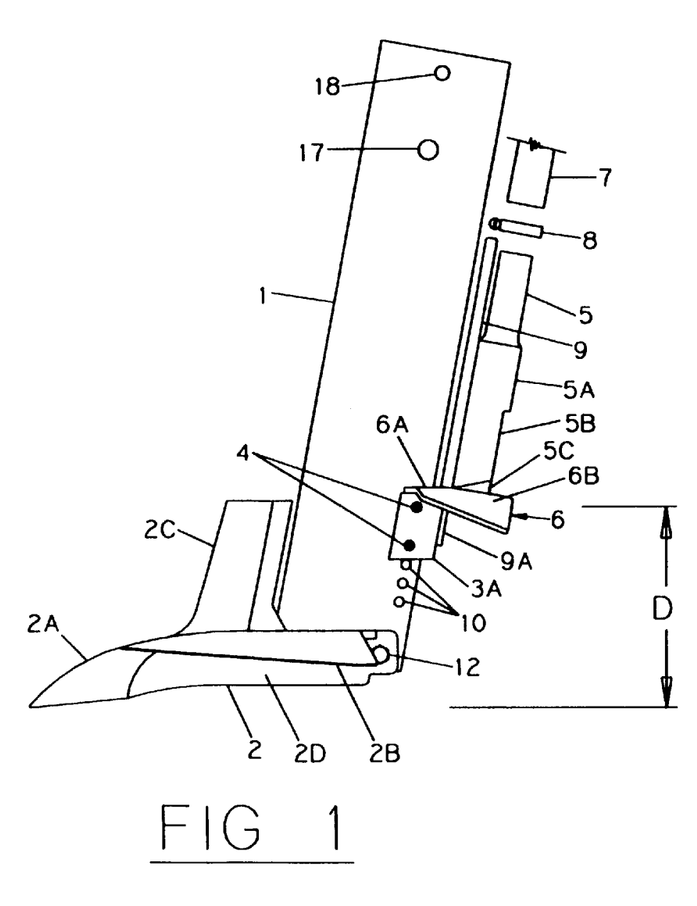
FIG. 1 is a left side elevation view of tillage and fertilizer placement apparatus incorporating the present invention.

Referring first to FIG. 1, there is shown a combination tillage tool and fertilizer placement device including a chisel plow shank generally designated 1. The shank 1 is mounted at its upper end by conventional bolts to an implement frame adapted to be drawn by a tractor. The forward direction is to the left in FIG. 1. The implement frame conventionally includes a long, transverse main tubular frame member or "toolbar" which extends the desired width for the number of shanks chosen. The location of the shanks may be changed when it is desired to change the spacing between adjacent shanks. Typical implements have four, six, eight or more shanks mounted to the toolbar at lateral spacings of 24–36 inches. Closer or wider spacings may be used if desired.

Figure 2:
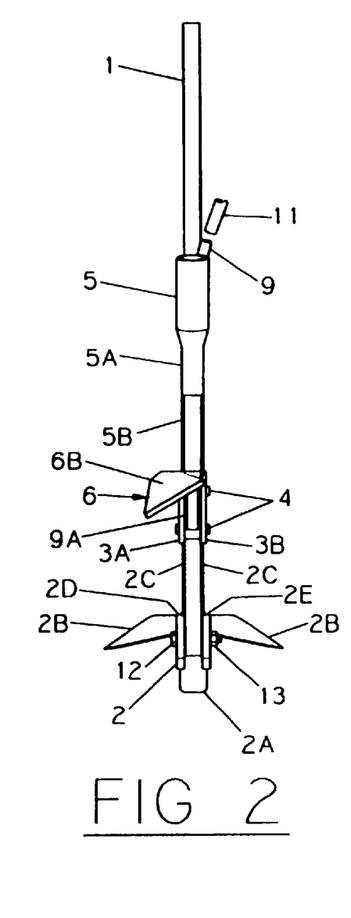
FIG. 2 is a rear view of the apparatus of FIG. 1.

A tillage or soil working unit generally designated 2 is mounted to the bottom of the shank and includes a breaking point 2A extending well in front of the shank 1 and forming a rounded leading surface of the point 2A for breaking and slightly lifting soil at the desired primary tillage depth. As disclosed in my U.S. Pat. No. 5,540,288, the soil working unit 2 is characterized as a "no till" unit because it is designed to minimize the disturbance of surface residue. That is, ideally, surface residue is not disturbed. In the real world there is some disturbance which may vary with soil and moisture conditions. In a preferred configuration, working unit 2 includes left and right wings, designated 2B, as best seen in FIG. 2, extending laterally to either side of the shank 1, and forming what is referred to as a "delta wing" arrangement. The wings are characterized as having increasing overall width from front to rear, downwardly turned at their outer edges, and generally little or no "lift" in the fore-to-aft direction.

Figure 11:
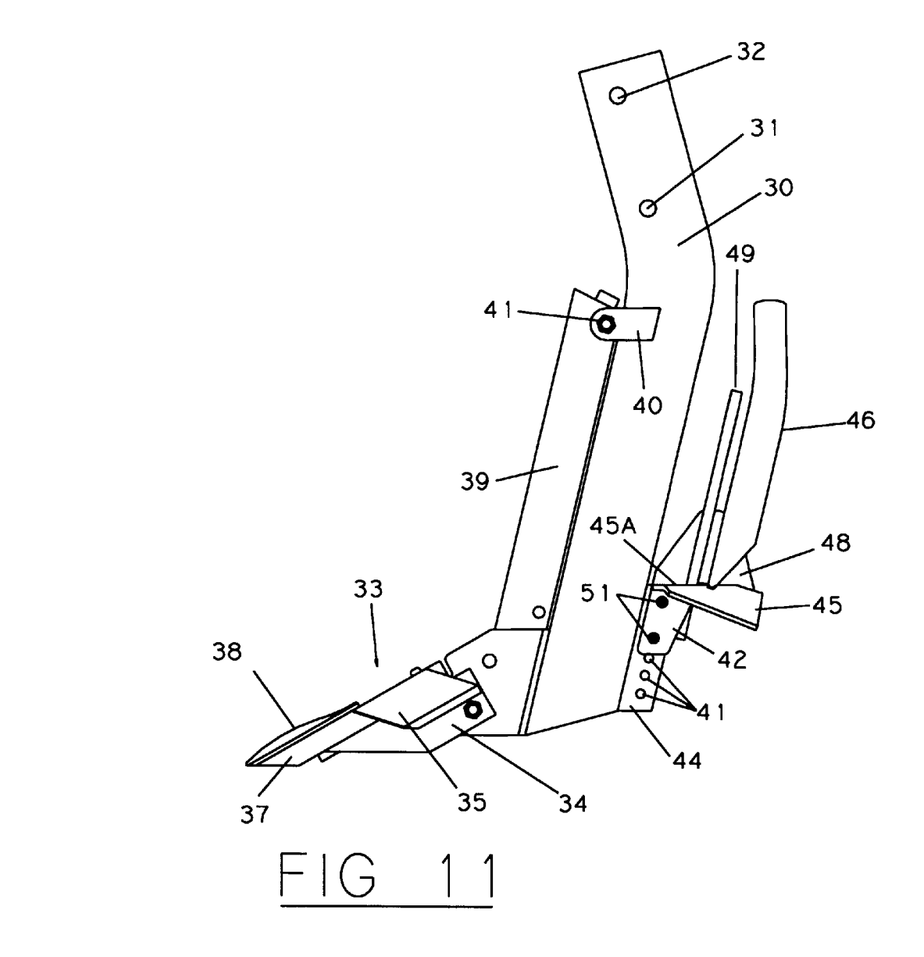
FIG. 11 is a left side elevational view of a fourth embodiment of the invention in which the fertilizer weldment is adapted to an existing tillage shank.
Figure 12:
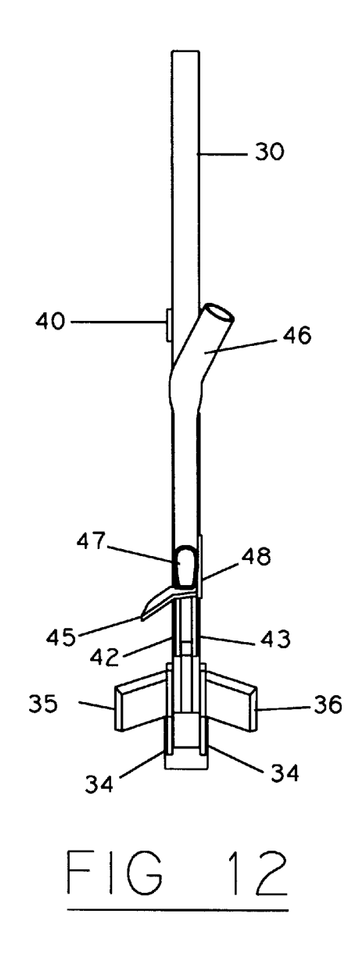
FIG. 12 is a rear view of the apparatus of FIG. 11.

By comparing FIGS. 1 and 2, it can be seen that the shank 1 is, as preferred, relatively thin laterally (approximately ¾ in.), but comparatively long in the direction of travel, thereby providing strength against rearward deflection and reducing vibration. To provide sufficient strength, as is known, the shank is preferably made from 5160 alloy spring steel, which is difficult to weld. The thin width, however, reduces interference with the soil (or "bucking") and provides a narrower trench or slot behind the shank than wider, more aggressive shanks as shown in the embodiment of FIGS. 11 and 12, for example.

The soil working unit 2 of the chisel plow also includes a fin 2C extending from the top of the point in front of the lower portion of the shank. The leading vertical portion of the fin 2C (sometimes referred to as a "shark fin") is narrowed to an edge, and then, proceeding rearwardly, the width increases to slightly larger than the width of the shank 1, as seen in FIG. 2. This structure permits the fin to part the soil already loosened by the breaking point 2A in a gradual separation, rather than by the blunt forward edge of the shank 1.

The working unit 2 is mounted to the bottom of the shank 1 by means of a pair of side plates, 2D, 2E, and a bolt 12 received through the side plates 2D, 2E and a hole at the rear of the shank 1, and secured by a nut 13 (FIG. 2).

To the rear of the shank 1, above the working unit 2, there is mounted a weldment including a diverter plate 6, referred to as a "shoe". The shoe 6 is formed of sheet metal which is part of the weldment. The weldment also includes left and right vertical mounting plates 3A, 3B (FIG. 2) which are welded respectively to either side of the shoe 6 and straddle the shank 1. The shoe 6 has a horizontal flat section 6A (see FIG. 8 also) which extends below, and is welded to and forms the bottom of a fertilizer delivery (or "drop") tube 5, and a wing 6B which is located to the left side of, and rearward of the shank 1. The wing 6B is sloped downwardly proceeding to the left of the shank and to the rear, as seen in FIG. 2.

The flat section 6A of the shoe 6 is formed to fit around the rear of the shank 1, and first and second mounting plates 3A, 3B are welded respectively to the shoe 6 at a spacing to straddle the shank. The plates 3A, 3B mount the fertilizer applicator assembly weldment including shoe 6 to the shank by a pair of roll pins 4.

An opening 6G (FIG. 8) is formed in the flat section 6A of the shoe forward of the delivery tube 5. A metal tube 9 for liquid fertilizer (i.e., anhydrous ammonia), if desired, is placed in this aperture and welded to the shoe, forming part of the fertilizer attachment weldment.

Thus, the shoe 6, delivery tube 5, mounting plates 3A, 3B and liquid fertilizer tube 9 form a rigid, integral assembly (the weldment referred to above) which may be adjusted as a unit by removing the roll pins 4, adjusting the unit until the holes in the mounting plates 3A, 3B align with selected holes 10 formed in a vertical spacing on the rear of the shank, and then re-inserting the roll pins 4 at the adjusted position.

The spacing of the adjustment holes 10 permit the shoe 6 to be mounted at different elevations relative to the working unit 2—and particularly relative to the operating depth of the breaking point 2A (i.e., the bottom of the furrow of broken, tilled soil formed by the tillage or working unit). The height of the placement of fertilizer above the bottom of the furrow formed by the working unit is indicated generally by the arrow D in FIG. 1.

A conventional, flexible fertilizer delivery hose 7, having a round cross-section is attached at one end to the top of a cylindrical upper portion of fertilizer delivery tube 5 by means of a clamp 8. The cylindrical upper portion is telescopically received in the lower portion of the delivery hose 7, the other end of which is connected to a source of particulate fertilizer. As is conventional, the fertilizer may be delivered with air assist. A lower section 5A of delivery tube 5 is flattened to a width slightly larger than the width of the shank 1, as seen in FIG. 2. A portion of the rear wall of the flattened section 5A of the fertilizer delivery tube 5 is notched open, as seen in FIGS. 1, 2, 8 and 9. The rear opening 5B is provided not as a discharge opening for the fertilizer, although some fertilizer may flow through opening 5B. Rather, the opening 5B permits the user access into the tube for dislodging clumps of fertilizer or other obstructions. It will thus be apparent to those skilled in the art from this and the description of FIGS. 3 and 4 that delivery "tube" as used herein does not require a closed periphery throughout the axial length of the tube, nor even any closed periphery as in the embodiments of FIGS. 3 and 4. The bottom of the drop tube 5, as mentioned, is welded to the flat section 6A of the shoe 6, so that fertilizer engages the top of the flat section 6A of the diverter shoe 6 and then flows laterally out the bottom the delivery tube through a lateral discharge opening SC having a wedge shape, pointed at the front and wider at the rear. The fertilizer then flows along the upper surface of the wing of the diverter shoe and into a pocket formed in the loosened soil.

Figure 8:
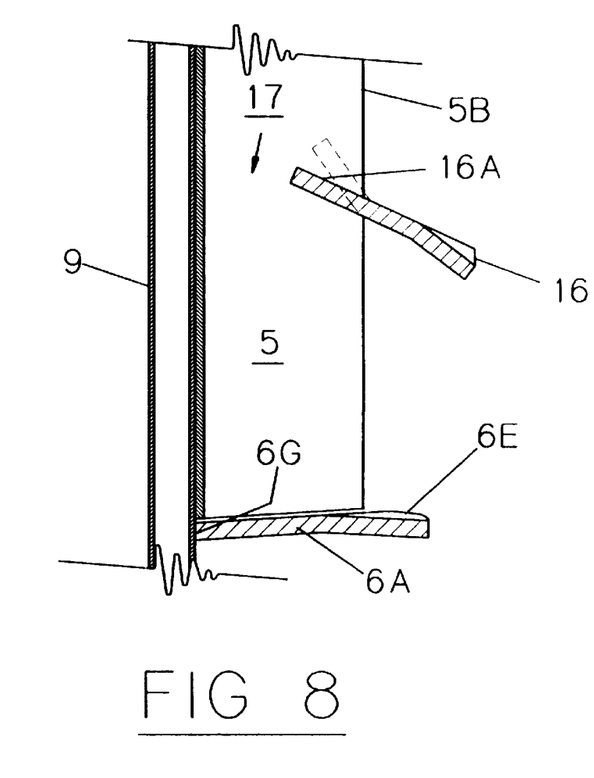
FIG. 8 is a vertical cross section view taken along sight line 8—8 of FIG. 7 showing the upper and lower shoes in vertical section.
Figure 9:
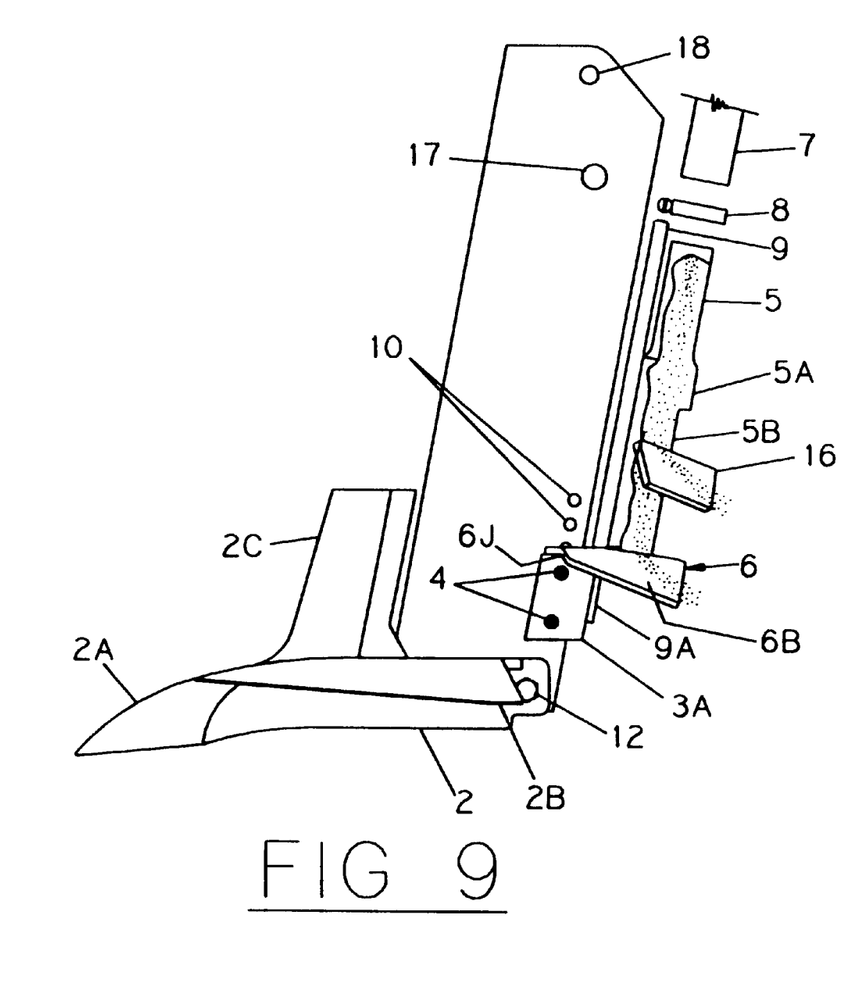
FIG. 9 is a left side view of the apparatus of FIG. 5 with the fertilizer drop tube partly cut away to show diagrammatically the placement of fertilizer at two different levels.

At the rear of the shoe 6, behind slot 5B of the delivery tube 5, there is flat, back section 6E (FIG. 8). At the left side of the shoe 6, the wing 6B slopes rearwardly and downwardly. The wing has an inclined leading edge 6J (FIG. 9). The wing 6B is sloped downwardly and rearwardly from the leading edge 6J. The wing 6B of the shoe gathers soil from the side of the shank and moves it to the rear, so that the soil has already been fractured, but not displaced substantially, by the working unit 2. This loosened soil, due to the rearward and downward inclination of the wing 6B is gathered by the wing and moved inwardly to the center and behind the shank 1 to serve two purposes. First, it fills the slot left by the point 2 and the lower portion of the shank 1—namely, that portion generally indicated by the length of arrow D in FIG. 1. Secondly, by gathering soil from the side of the shank and displacing it inwardly behind the shank, the wing 6B of the shoe 6 packs the loosened soil slightly to fill the slot left by the shank and create a pocket or shelf above the wing 6B into which fertilizer flows, as illustrated in FIG. 9. That is, particulate fertilizer flows through the delivery tube 5 until it engages the flat section 6A of shoe 6. From there, because of the force of gravity and air assist on the fertilizer, forcing it down the delivery tube, the fertilizer flows laterally above the flat portion or shelf 6A of the shoe 6, through discharge opening 5C and over the upper surface of the sloped wing 6B, guided into the fissure or pocket formed by the inclined wing 6B of the shoe 6.

The shank 1 is mounted to conventional chisel plow mounting brackets (not shown), by means of a first bolt passing through a larger hole 17, and a shear bolt, also not shown, placed through a smaller aperture 18. This allows the shank to pivot counterclockwise about the hole 17 as seen in FIG. 1 if an object is struck causing the shear bolt to rupture. As the shank pivots rearwardly, the flexible fertilizer delivery hose 7 bends rearwardly to accommodate the motion of the shank, as is known.

As mentioned, liquid fertilizer tube 9 is located behind the shank 7 and forward of the particulate fertilizer delivery tube 5. The tube 9 extends below the shoe 6, as seen at 9A in FIG. 1 for delivering liquid fertilizer such as anhydrous ammonia, if desired, in addition to particulate fertilizer.

Figure 3:
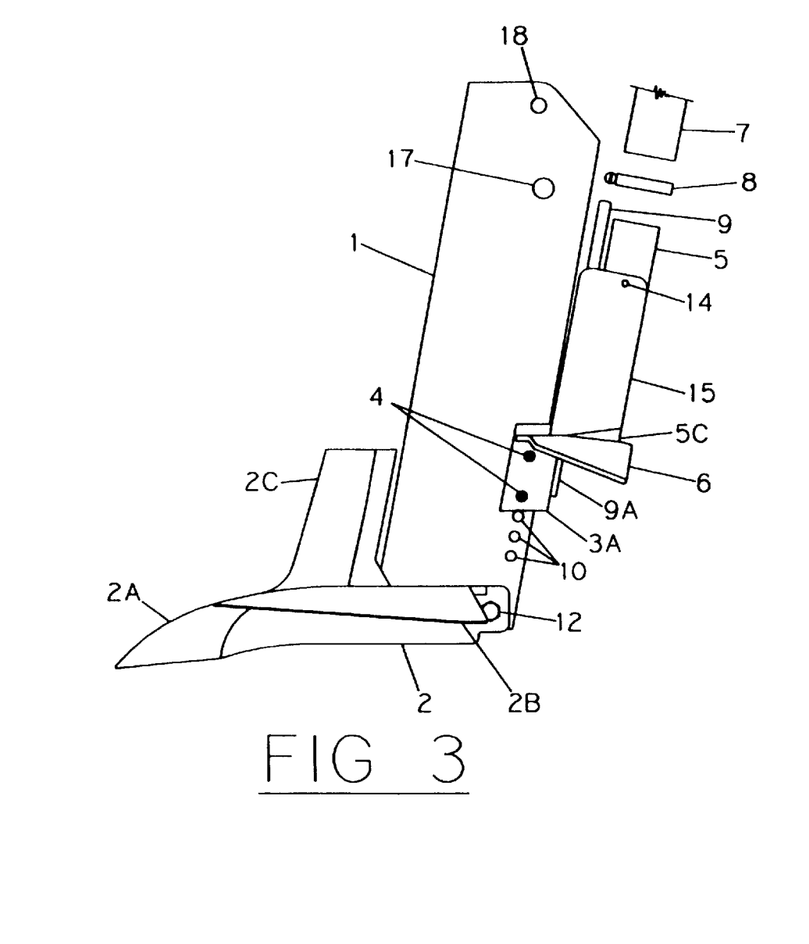
FIG. 3 is a left side elevation view of a second embodiment of the invention allowing the fertilizer delivery hose to pivot if the tillage apparatus strikes a rock or obstruction and the shank bolt shears.
Figure 4:
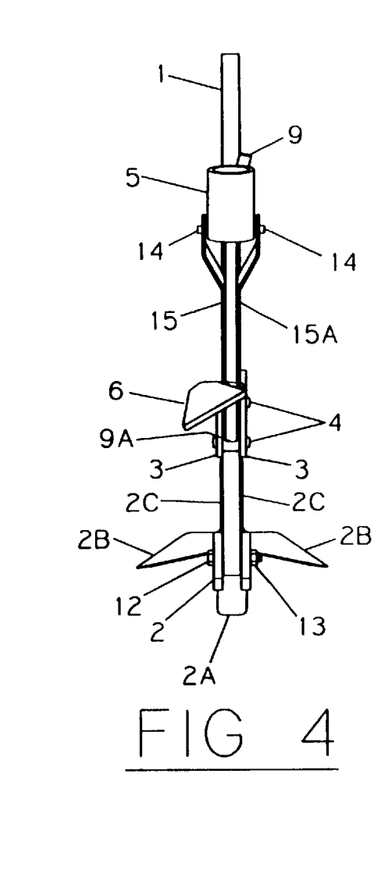
FIG. 4 is the rear view of the apparatus shown in FIG. 3.

Turning now to the embodiment of FIGS. 3 and 4, those elements or structure which have already been described are shown with the same reference numerals and need not be further described here. In the embodiment of FIGS. 3 and 4, the chisel plow shank 1 is shorter than shank 1 of FIG. 1. When the shear bolt received in the hole 18 ruptures when the point strikes an obstruction, the shank again pivots about a bolt received in the larger hole 17. However, the delivery tube 5 is shorter and must pivot about a shorter radius. Thus, the delivery tube 5 includes to two side plates 15, 16 (see FIG. 4) which are welded to the top of the shoe 6 and behind the shank 1. Thus, the rear of the delivery tube in this embodiment is open top to bottom. The top of the plates 15, 16 are formed outwardly as seen in FIG. 4 to form a trunnion; and the plates attach by means of rivets 14 directly to the bottom or discharge end of the shorter fertilizer delivery tube 5. This permits the fertilizer applicator assembly to pivot about the rivets 14 so that the delivery tube 7 does not have to bend sharply when the shear bolt ruptures.

Figure 5:
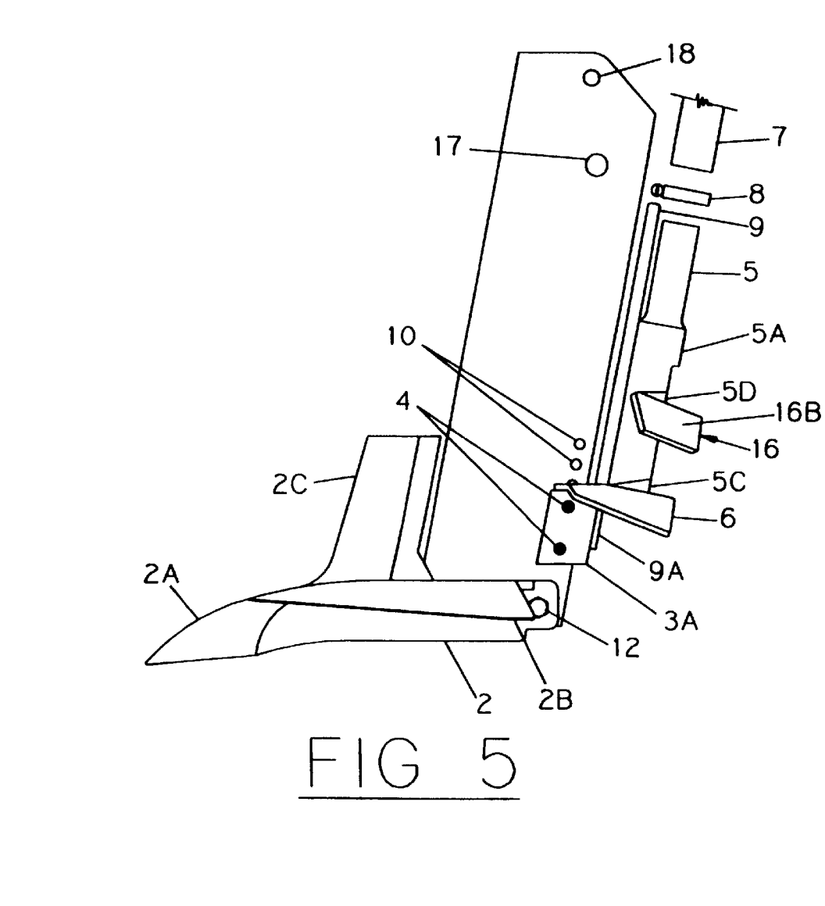
FIG. 5 is a left side view of the apparatus of FIG. 1 with the addition of a second diverter shoe to place a portion of the fertilizer at a shallower depth.
Figure 6:
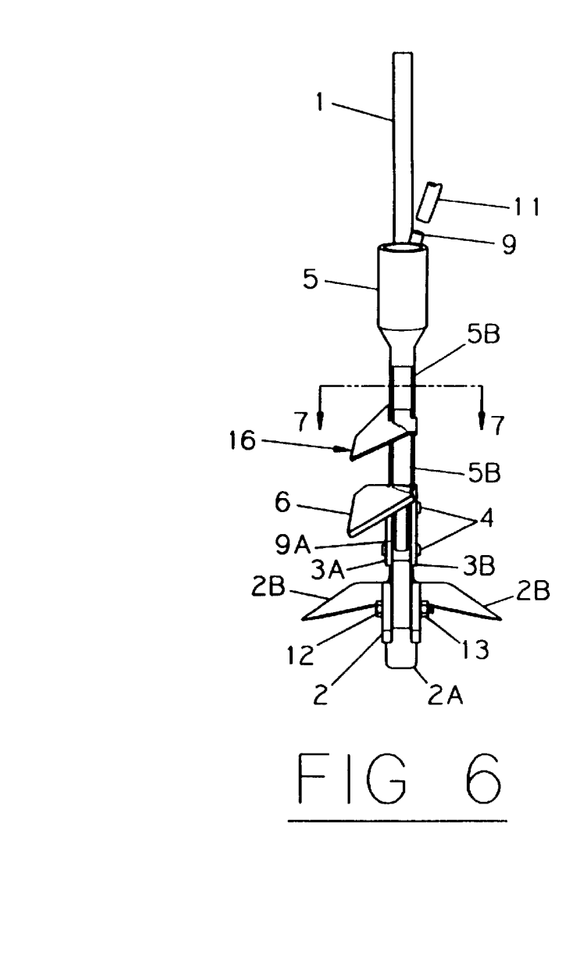
FIG. 6 is a rear view of the apparatus shown in FIG. 5.
Figure 7:
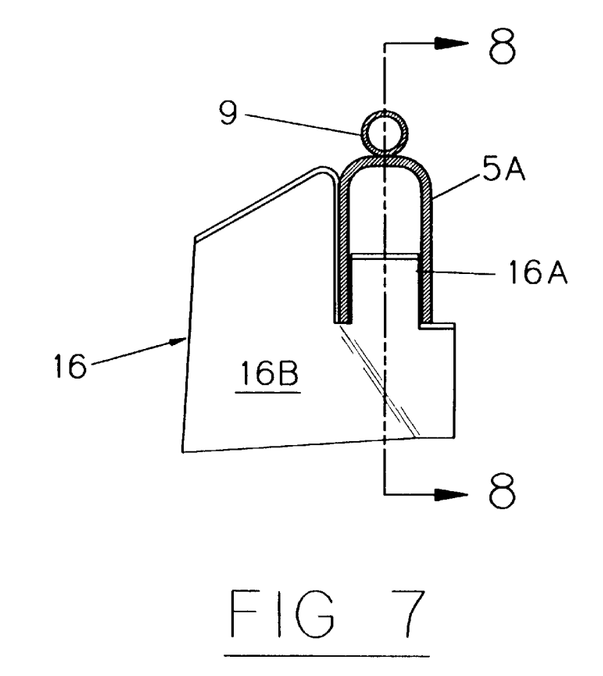
FIG. 7 is a horizontal cross section view taken along sight line 7—7 showing the upper shoe.

Turning now to the embodiment of FIGS. 5 and 6, again, those elements and structure which have been shown above are repeated with the same reference numerals and need not be further explained here. In the embodiment of FIGS. 5 and 6, a second, upper diverter shoe 16 has been added. The upper shoe 16 is welded directly to the fertilizer delivery tube 5 adjacent an upper discharge aperture 5D. As best seen in FIGS. 7 and 8, the upper shoe 16 includes a tongue 16A which extends partially into the rear slot 5B of the drop tube 5, and a lateral wing 16B which serves a purpose similar to that for the previously described wing 6B in connection with the lower shoe 6.

The tongue 16A in the upper shoe extends only partially into the central opening of the delivery tube in order to provide a forward opening 19 through which most of the fertilizer may drop. To adjust the apportioning of fertilizer between the upper and lower diverter shoes 6, 16, the tab 16A may be bent as illustrated in phantom in FIG. 8.

The use of the upper shoe 16 permits adjustment of the amount of fertilizer to be placed in a band at a shallower depth than that of the lower shoe, as seen in FIG. 9. This provides nutrients for young plants shortly after planting, but it also provides a band of nutrients at the deeper root zone depth for later in the growing season when normally there is less water but when the roots are at a deeper location.

Figure 10:
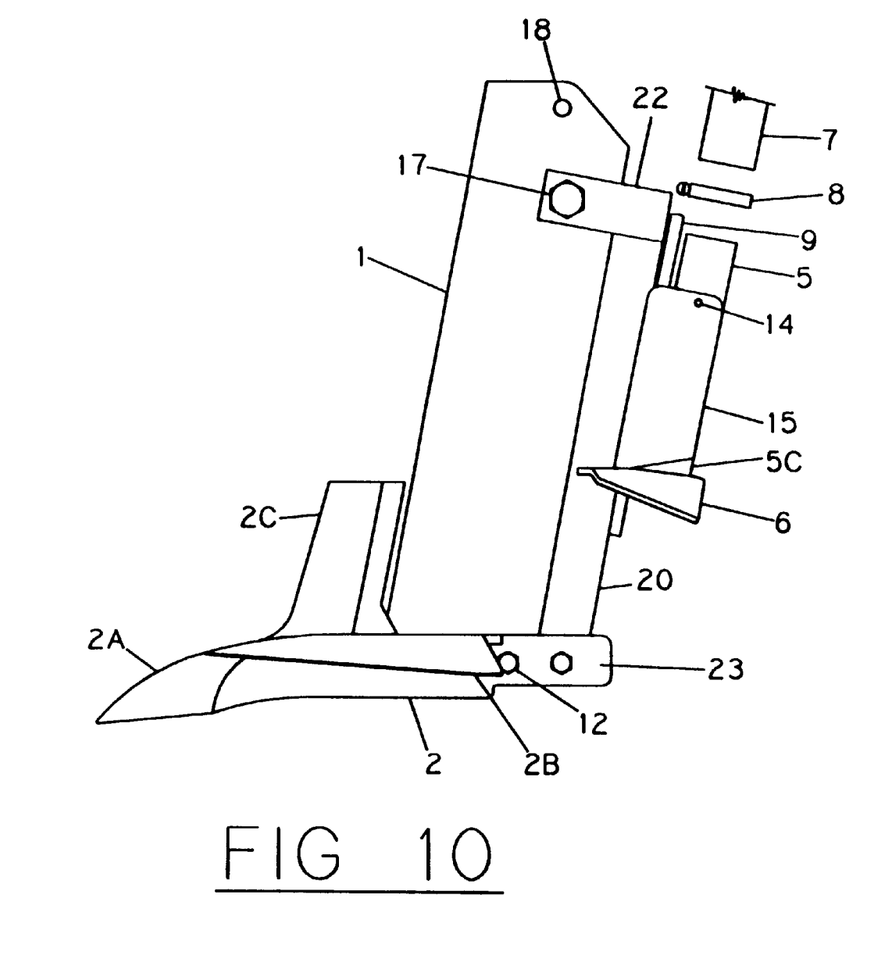
FIG. 10 is a left side view of a third embodiment of the apparatus of FIG. 1 with the fertilizer weldment mounted to a bracket behind the shank to provide a uniform operating width at the operating level above the point.

Turning now to the embodiment of FIG. 10, it is similar to the previously described embodiment of FIGS. 3 and 4, so that again, those elements and structure which have been shown and described above are repeated with the same reference numerals and need not be further explained here. In this embodiment, the fertilizer attachment weldment again includes a deliver tube 5 for particulate fertilizer, a smaller tube 9 for delivering liquid fertilizer, if desired, a diverter shoe 6 and first and second side plates, one of which is shown at 15, welded into a single weldment. In addition, the weldment includes a vertically elongated adapter bracket 20 which has a width approximately the same as the width of the shank 1, and is welded to the shoe 6 and the side plates 15, 15A. In addition, a pair of upper mounting straps are welded to the top of the bracket 20, and extend forwardly, straddling the upper sides of the shank 1. One of these mounting straps is seen at 22 in FIG. 10, and it extends forwardly and includes an aperture which receives the mounting bolt 17. A similar mounting strap is located on the other side of the upper portion of the mounting bracket 20 and similarly mounted to the shank 1 by the bolt 17 and an associated nut (not shown in FIG. 10).

The lower part of the mounting bracket 20 is received in two rearward extensions of the side plates (2D, 2E of FIG. 2) of the working unit 2 which extend rearwardly beyond the rear edge of the shank 1, one such extension being designated 23 in FIG. 10. The two extensions are spaced by the thickness of the shank 1, and the bottom of the mounting bracket 20 is provided with an aperture in register with corresponding apertures in the extensions 23. A bolt 25 is received through the aligned apertures to secure the bottom of the mounting bracket 20. This embodiment of the fertilizer applicator weldment has the advantage that the width of the fertilizer applicator assembly mount is substantially the same as the width of the shank, whereas the mounting plates 3A, 3B in the embodiment of FIGS. 1 and 2 extend laterally beyond the sides of the shank 1, and can cause some disruption of surface soil under certain conditions. However, in the embodiment of FIG. 10, the fertilizer shoe is not adjustable. Provision could be made for adjustment, or a number of different weldments, each with the shoe at a different height on the mounting bracket 20, could be provided where height adjustment is desired.

Turning now to the embodiment of FIGS. 11 and 12, there is shown a modification of the fertilizer applicator weldment for cooperation with a different chisel plow shank and working unit. By way of general explanation, the shank shown in FIGS. 11 and 12 is referred to as a "minimum residue displacement" structure. It is more aggressive than the embodiment of FIGS. 1 and 2 which, ideally, provides for almost no residue displacement. The benefits, however, of placing fertilizer in the root zone, and in combination with a primary tillage point may be achieved even in more aggressive chisel plows.

Turning then to the embodiment of FIGS. 11 and 12, the shank 30 is adapted to be conventionally mounted by two mounting holes 31, 32. A working unit or tillage point generally designated 33 is mounted to the lower, forward portion of the shank 30 by means of an adapter bracket 34. The point 33 includes first and second sloped wings 35, 36 which extend downwardly, outwardly and rearwardly from an elongated tooth or bar 37 which is provided with a hardened work surface 38. The width of the bar 37 and work surface 38 is wider, and more blunt than that of the breaking surface 2A of the embodiment of FIG. 1. Thus, the point of FIG. 11 is more aggressive in lifting and fracturing soil; and moreover, the slope of the wings 35 (approximately 30°) is such as to lift the fractured soil and further pulverize it.

Extending upwardly from the adapter bracket 34 is a shin or wedge surface 39, mounted by means of a pair of straps 40 and a bolt 41 to the shank 30 at a location at or above the soil surface when the unit is in a use position.

The shank 30 may be made from conventional steel, and it derives its strength from being thicker than the thin shank of the FIG. 1 embodiment. The shank 30 may be made from more conventional steel which is weldable. At the rear, heel portion of the shank 11 there is welded a mounting bracket 40 with a series of vertically spaced apertures 41 for receiving and mounting a pair of spaced mounting plates 42, 43 which form part of the fertilizer attachment weldment. The fertilizer attachment weldment also includes a diverter shoe 45 welded to the mounting plates 42, 43. A delivery tube 46 having a discharge aperture 47 is welded to a horizontal portion 45A of the diverter shoe 45. A side shield plate 48 is also welded to the side plate 43, the diverter shoe 45 and the lower side of the delivery tube 46. A liquid fertilizer tube 49 is also welded to the shield plate 48 and the forward portion of the diverter shoe 45 as described above, extending through an aperture in the horizontal portion 45A of the diverter shoe.

As seen in the drawing, the diverter shoe 45 includes a laterally extending wing, as in the previous embodiments, which extends downwardly and slightly rearwardly for gathering loosened soil to fill the furrow behind the shank and to form the side soil pocket for laterally dispersing particulate fertilizer. The discharge opening 47 (FIG. 12) is inclined upwardly and rearwardly and is formed only at the bottom of the delivery tube.

The side mounting plates 42, 43 of the weldment are secured to the mounting bracket 44 welded to the heel of the shank by means of a pair of mounting bolts 51. The height of the fertilizer applicator weldment may be adjusted by removing the bolts 51, adjusting the fertilizer applicator weldment to the proper height and aligning the apertures in the mounting plates 42, 43 with the selected apertures 41 on the mounting bracket 44, and then securing the weldment with the bolts 51. A liquid fertilizer tube 9 for anhydrous ammonia may be provided.

As seen in FIG. 12, the combined width of the mounting plates 42, 43 of the weldment and the mounting bracket 44 of the shank is substantially equal to the width of the shank 30. Thus, as with the embodiment of FIG. 10, the mounting plates of the weldment assembly need not protrude out laterally beyond the sides of the shank.

In the practice of the invention, the primary or lower diverter shoe is preferably located to place the fertilizer at a depth approximately in the range of 4 to 8 inches. When an upper and lower shoe are used, the upper shoe places fertilizer at a depth approximately in the range of 2 to 4 inches below the surface of the soil, and the primary shoe places fertilizer in the range of about 2 to 6 inches below the upper shoe. The base of the tillage tool may be set to work the soil at a depth approximately in the range of 9 to 12 inches. Thus, the primary diverter shoe may be above the base of the tillage tool approximately in the range of 3 to 9 inches.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. Apparatus for tilling soil while distributing particulate fertilizer comprising: a shank adapted to be pulled in soil in a use position and extending below the depth at which it is desired to distribute the fertilizer; a tillage tool mounted in front of said shank for loosening soil at least at a desired depth; a fertilizer delivery tube including a discharge opening and mounted behind said shank for delivering fertilizer through said discharge opening; and a shoe extending behind said shank, said shoe including at least one wing extending laterally and rearwardly of said shank, said wing gathering soil loosened by said tillage tool and urging said soil into the furrow behind said shank, said wing further extending downwardly proceeding away from the shank both laterally and rearwardly to compact loosened soil laterally adjacent said shank to form a horizontally elongated pocket sloping laterally downwardly; whereby said fertilizer is delivered laterally into said pocket formed by said wing.

2. The apparatus of claim 1 wherein said shoe and said delivery tube are welded together to form a weldment, said weldment further including at least one mounting plate for removably mounting said weldment to said shank in a vertically adjustable location relative to said tillage tool.

3. The apparatus of claim 2 wherein said shank includes a plurality of vertically spaced apertures; and wherein said mounting plate of said weldment includes apertures arranged to align with said apertures of said shank, said apparatus including one of bolts or pins for removably mounting said weldment to said shank by insertion in aligned apertures of said shank and said weldment, whereby said weldment may be adjustably mounted to said shank to adjust the height of said shoe relative to said tillage tool, and thereby to adjust the height at which said particulate fertilizer is deposited relative to said tillage tool.

4. The apparatus of claim 3 characterized in that said height at which said fertilizer is deposited above said tillage tool is approximately in the flange of three to nine inches.

5. The apparatus of claim 3 wherein said discharge aperture of said delivery tube extends at least through a side of said tube and forwardly of the rearmost extension of said shoe, said shoe being mounted to form the bottom of said delivery tube.

6. The apparatus of claim 5 wherein said tillage tool includes a broad breaking point and first and second wings extending laterally of said shank, said wings characterized as being inclined upwardly from front to rear, and extending laterally outwardly of said shank for imparting some lifting motion to the soil broken by said breaking point.

7. The apparatus of claim 6 further including a fin extending upwardly of said tillage unit and including a leading edge located forwardly of said shank for parting and moving broken soil laterally to the side of said shank to flow around said shank.

8. The apparatus of claim 3 including first and second mounting plates, and wherein said first and second mounting plates, said shoe and said delivery tube are welded into a rigid assembly; and wherein said shank includes a rearwardly extending mounting bracket defining a set of vertically spaced adjustment apertures for receiving one of said pins or bolts, said shank mounting bracket being less than the width of said shank, and characterized in that the combined width of said shank mounting bracket and said first and second mounting plates of said weldment are substantially equal to the width of said shank.

9. The apparatus of claim 2 wherein said tillage tool includes a forward breaking point in front of said shank, and first and second laterally extending wings, said wings of said tillage tool forming a generally delta shape and extending laterally outwardly and downwardly from said shank.

10. The apparatus of claim 9 wherein said wings of said tillage tool are characterized as extending substantially horizontally along lines equidistant from said shank and extending in a fore-and-aft direction, said wings of said tillage tool further characterized as having substantially no soil lift surface in a fore-to-aft direction.

11. The apparatus of claim 10 wherein said tillage tool further has an upwardly extending fin defining a leading edge in front of said shank and extending vertically from a location adjacent said wings upwardly to approximately the location of said shoe, for parting soil broken by said point and urging said soil to flow laterally around said shank.

12. The apparatus of claim 2 wherein said fertilizer delivery tube includes first and second side plates extending above said shoe and forming a trunnion mount receiving a fertilizer delivery hose; and a pivot member extending through the lower portion of said fertilizer hose and the trunnion portion of said side plates of said fertilizer delivery means for permitting said weldment assembly to pivot rearwardly in the event said shank pivots rearwardly.

13. The apparatus of claim 1 further including a second diverter shoe mounted to said fertilizer applicator assembly above said first shoe, said second shoe including a second wing extending laterally and rearwardly of said fertilizer delivery means to form a second pocket in the soil above said first-named pocket, said second shoe further including a tongue extending inwardly of said fertilizer delivery means for engaging at least a portion of the stream of fertilizer passing through said delivery means and for diverting at least some of said fertilizer laterally outwardly and into said second pocket formed by said second shoe at a location near the surface of the soil and above said first shoe, whereby fertilizer deposited by said first shoe is in a band at a comparatively deeper depth and is available to more mature crop, and fertilizer deposited by said second shoe in a band at a comparatively shallow depth and is available to emerging crop.

14. The apparatus of claim 13 wherein said fertilizer delivery tube defines a first lateral discharge opening adjacent said first diverter shoe and a second lateral discharge opening adjacent said second diverter shoe.

15. An integral weldment adapted to be assembled to the rear of a shank of a chisel plow, said chisel plow including a tillage tool mounted in front of said shank for loosening soil, said weldment comprising: a fertilizer delivery tube having a lower portion formed into a width approximately the width of said shank and defining a discharge opening; a diverter shoe welded to said delivery tube and including a wing adjacent said discharge opening and extending laterally and rearwardly of said delivery tube and adapted to engage loosened soil passing around said shank in use, said wing gathering said loosened soil and moving it behind said shank, said wing further compacting said soil vertically to form a pocket in said soil, whereby said fertilizer stream passes through said discharge opening and into said pocket formed by said shoe; and a mounting plate rigidly connected to said diverter shoe and adapted for mounting said weldment to said shank at an adjusted height above said tillage tool and to the rear of said tillage tool.

16. The apparatus of claim 15 further comprising a second shoe mounted to said delivery means above said first shoe, said first shoe being adapted to divert fertilizer from said delivery tube into a pocket formed by said first shoe at a level above said tillage unit and at a depth of approximately four to eight inches, said second shoe being adapted to form a pocket and deliver fertilizer into said pocket at a depth of approximately two to four inches beneath the surface of said soil.

17. The apparatus of claim 15 further comprising a mounting bracket fixed to said shank and extending rearwardly thereof and a second mounting plate on said weldment and spaced from said first mounting plate to receive said mounting bracket, wherein said mounting bracket of said shank has a width not greater than said shank and includes a plurality of vertically spaced apertures, and wherein said mounting plates of said weldment include at least first and second vertically spaced apertures adapted to align with corresponding apertures on said mounting bracket of said shank, and characterized in that the overall width of said mounting bracket and said first and second mounting plates is approximately the width of said shank.

* * * * *